(12) United States Patent
Chiu

(10) Patent No.: US 10,234,654 B2
(45) Date of Patent: Mar. 19, 2019

(54) LENS ASSEMBLY

(71) Applicants: Sintai Optical (Shenzhen) Co., Ltd., ShenZhen, Guangdong Province (CN); Asia Optical Co., Inc., Taichung (TW)

(72) Inventor: Wei-Ting Chiu, Taichung (TW)

(73) Assignees: SINTAI OPTICAL (SHENZHEN) CO., LTD., Shenzhen, Guangdong Province (CN); ASIA OPTICAL CO., INC., Taichung (TW)

( * ) Notice: Subject to any disclaimer, the term of this patent is extended or adjusted under 35 U.S.C. 154(b) by 0 days.

(21) Appl. No.: 15/722,290

(22) Filed: Oct. 2, 2017

(65) Prior Publication Data

US 2018/0149834 A1    May 31, 2018

(30) Foreign Application Priority Data

Nov. 28, 2016  (CN) .......................... 2016 1 1064383

(51) Int. Cl.
| | |
|---|---|
| G02B 3/02 | (2006.01) |
| G02B 9/62 | (2006.01) |
| G02B 27/00 | (2006.01) |
| G02B 13/18 | (2006.01) |
| G02B 13/06 | (2006.01) |

(52) U.S. Cl.
CPC ............... *G02B 9/62* (2013.01); *G02B 13/06* (2013.01); *G02B 13/18* (2013.01); *G02B 27/0025* (2013.01)

(58) Field of Classification Search
CPC .................................................. G02B 13/0045
USPC .......................................................... 359/713
See application file for complete search history.

(56) References Cited

U.S. PATENT DOCUMENTS

2014/0198395 A1*  7/2014  Ryu ................... G02B 13/0045
                                                     359/713

* cited by examiner

*Primary Examiner* — James C. Jones
(74) *Attorney, Agent, or Firm* — McClure, Qualey & Rodack, LLP

(57) ABSTRACT

A lens assembly comprises sequentially from an object side to an image side along an optical axis a first lens, a second lens, a third lens, a fourth lens, a fifth lens and a sixth lens. The first lens is a meniscus lens with negative refractive power. The second lens is a meniscus lens with negative refractive power. The third lens is a biconvex lens with positive refractive power. The fourth lens is a biconvex lens with positive refractive power. The fifth lens is a biconcave lens with negative refractive power. The sixth lens is a biconvex lens with positive refractive power.

20 Claims, 12 Drawing Sheets

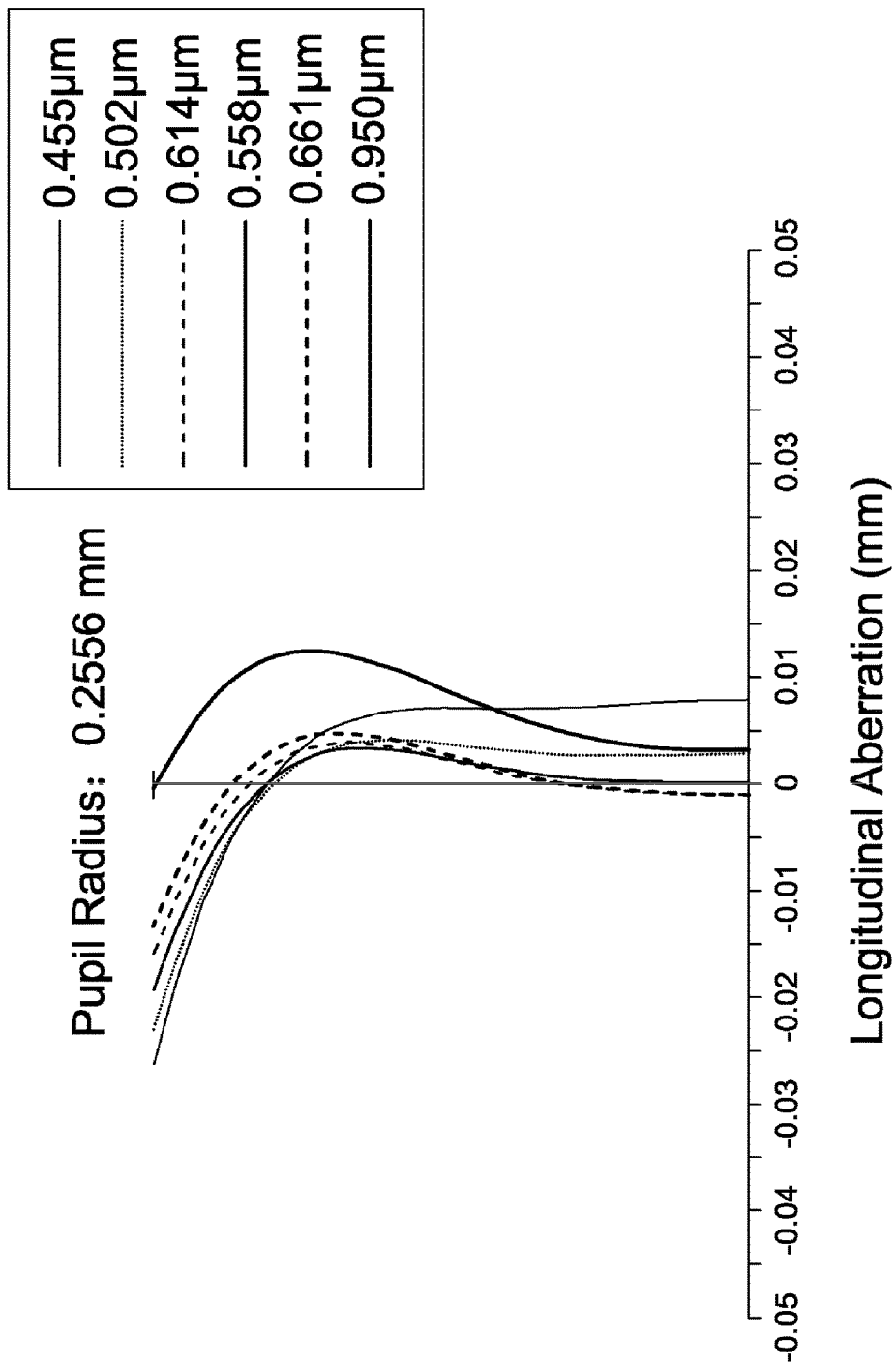

LENS ASSEMBLY

CROSS REFERENCE TO RELATED APPLICATIONS

This Application claims priority of China Patent Application No. 201611064383.4, filed on Nov. 28, 2016, the entirety of which is incorporated by reference herein.

BACKGROUND OF THE INVENTION

Field of the Invention

The invention relates to a lens assembly.

Description of the Related Art

In recent years, depending on different applications of needs, lens assembly not only has been gradually developed toward miniaturization and wide field of view, but also has been ability of large aperture and resistance to variations of the ambient temperature. However, the conventional lens assembly has been unable to meet demand, and we need another new structure of the lens assembly, and that can meet the requirements of the miniaturization, wide field of view, large aperture and resistance to variations of the ambient temperature simultaneously.

BRIEF SUMMARY OF THE INVENTION

The invention provides a lens assembly to solve the above problems. The lens assembly is provided with characteristics of a short total lens length, wider field of view, a smaller F number and a resistance to environment temperature variation, and still has a good optical performance and can meet a requirement or resolution.

The lens assembly in accordance with the invention in sequence from an object side to an image side along an optical axis, comprises a first lens which is a meniscus lens with negative refractive power; a second lens having a meniscus lens with negative refractive power; a third lens having a biconvex lens with positive refractive power; a fourth lens having a biconvex lens with positive refractive power; a fifth lens having biconcave lens with negative refractive power; a sixth lens having a biconvex lens with positive refractive power; the lens assembly satisfies the following condition: 6<FEFL/BEFL<10, wherein FEFL is an effective focal length of a combination of the first lens, the second lens and the third lens, and BEFL is an effective focal length of a combination of the fourth lens, the fifth lens and the sixth lens.

The lens assembly in accordance with the invention in sequence from an object side to an image side along an optical axis, comprises a first lens which is a meniscus lens with negative refractive power; a second lens having a meniscus lens with negative refractive power; a third lens having a biconvex lens with positive refractive power; a fourth lens having a biconvex lens with positive refractive power; a fifth lens having biconcave lens with negative refractive power; a sixth lens having a biconvex lens with positive refractive power; the lens assembly satisfies the following condition: 175<FOV/f<190, wherein FOV is a maximum field of view, and the unit of FOV is degree, f is an effective focal length of the lens assembly, and the unit of f is mm.

In accordance with the invention, the lens assembly satisfies the following condition: HFOV/f≥175°, wherein HFOV is a horizontal field of view.

In accordance with the invention, the lens assembly satisfies the following condition: VFOV/f≥115°, wherein VFOV is a vertical field of view.

In accordance with the invention, the lens assembly satisfies the following condition: $1<TTL/D_1<1.5$, wherein TTL is an interval from the object side surface of the first lens to an image plane along the optical axis, and $D_1$ is an effective diameter of the first lens.

In accordance with the invention, the lens assembly satisfies the following condition: $Vd_2-Vd_3<5$, wherein $Vd_2$ is the Abbe number of the second lens, and $Vd_3$ is the Abbe number of the third lens.

In accordance with the invention, the second lens further comprises at least an inflection point.

In accordance with the invention, the second lens is made of plastic material, the third lens is made of plastic material, the fifth lens is made of plastic material, and the sixth lens is made of plastic material.

In accordance with the invention, the second lens further includes two surfaces, at least one of which is an aspheric surface, the third lens further includes two surfaces, at least one of which is an aspheric surface, the fourth lens further includes two surfaces, at least one of which is an aspheric surface, the fifth lens further includes two surfaces, at least one of which is an aspheric surface, the sixth lens further includes two surfaces, at least one of which is an aspheric surface.

In accordance with the invention, the lens assembly further comprises a stop disposed between the third lens and the fourth lens.

In accordance with the invention, the first lens comprises a convex surface facing the object side and a concave surface facing the image side, the second lens comprises a convex surface facing the object side and a concave surface facing the image side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2A is a longitudinal spherical aberration diagram of a lens assembly in accordance with the first embodiment of the invention;

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
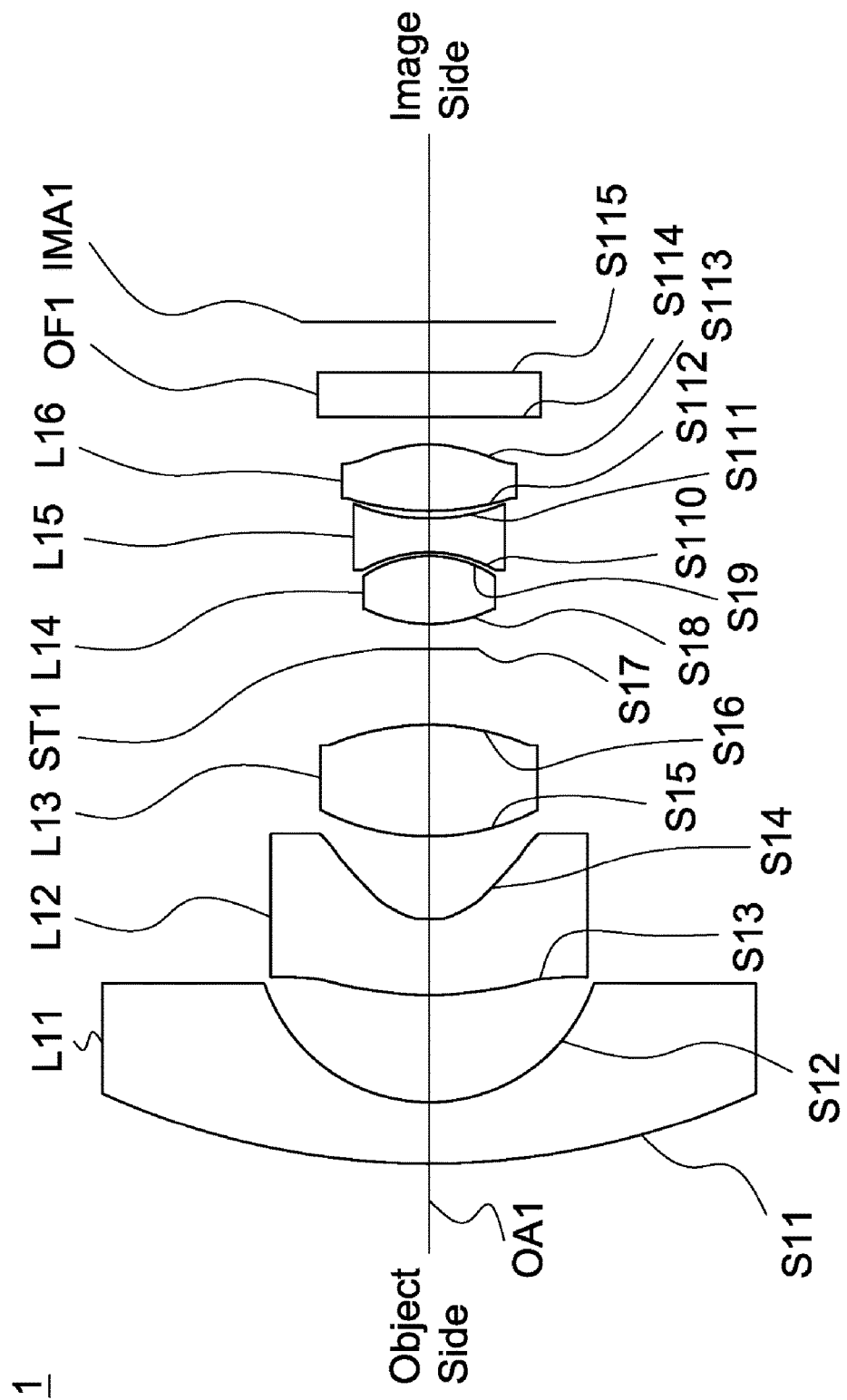
FIG. 1 is a lens layout and optical path diagram of a lens assembly in accordance with a first embodiment of the invention.

Referring to FIG. 1, FIG. 1 is a lens layout and optical path diagram of a lens assembly 1 in accordance with a first embodiment of the invention. The lens assembly 1 includes a first lens L11, a second lens L12, a third lens L13, a stop ST1, a fourth lens L14, a fifth lens L15, a sixth lens L16 and an optical filter OF1, all of which are arranged in sequence from an object side to an image side along an optical axis OA1. In operation, an image of light rays from the object side is formed at an image plane IMA1.

The first lens L11 is a meniscus lens with negative refractive power and made of glass material, wherein the object side surface S11 is a convex surface, the image side surface S12 is a concave surface and both of the object side surface S11 and image side surface S12 are spherical surfaces. The second lens L12 is a meniscus lens with negative refractive power and made of plastic material, wherein the object side surface S13 is a convex surface and having two inflection points, the image side surface S14 is a concave surface and both of the object side surface S13 and image side surface S14 are aspheric surfaces. The third lens L13 is a biconvex lens with positive refractive power and made of plastic material, wherein the object side surface S15 is a convex surface, the image side surface S16 is a convex surface and both of the object side surface S15 and image side surface S16 are aspheric surfaces. The fourth lens L14 is a biconvex lens with positive refractive power and made of glass material, wherein the object side surface S18 is a convex surface, the image side surface S19 is a convex surface and both of the object side surface S18 and image side surface S19 are aspheric surfaces. The fifth lens L15 is a biconcave lens with negative refractive power and made of plastic material, wherein the object side surface S110 is a concave surface, the image side surface S111 is a concave surface and both of the object side surface S110 and image side surface S111 are aspheric surfaces. The sixth lens L16 is a biconvex lens with positive refractive power and made of plastic material, wherein the object side surface S112 is a convex surface, the image side surface S113 is a convex surface and both of the object side surface S112 and image side surface S113 are aspheric surfaces. Both of the object side surface S114 and image side surface S115 of the optical filter OF1 are plane surfaces.

In order to maintain excellent optical performance of the lens assembly 1 in accordance with the first embodiment of the invention, the lens assembly 1 satisfies at least one of the following conditions:

$$6 < FEFL1/BEFL1 < 10 \quad (1)$$

$$HFOV1/f1 \geq 175° \quad (2)$$

$$VFOV1/f1 \geq 115° \quad (3)$$

$$175 < FOV1/f1 < 190 \quad (4)$$

$$1 < TTL1/D1_1 < 1.5 \quad (5)$$

$$Vd1_2 - Vd1_3 < 5 \quad (6)$$

Wherein FEFL1 is an effective focal length of a combination of the first lens L11, the second lens L12 and the third lens L13, and BEFL1 is an effective focal length of a combination of the fourth lens L14, the fifth lens L15 and the sixth lens L16, the lens assembly 1 satisfies the following condition: 6<FEFL1/BEFL1<10, which can provide excellent imaging quality in both high and low temperature environments. HFOV1 is a horizontal field of view of the lens assembly 1. VFOV1 is a vertical field of view of the lens assembly 1. FOV1 is a maximum field of view of the lens assembly 1, and the unit of FOV1 is degree, f1 is an effective focal length of the lens assembly 1, and the unit of f1 is mm, the lens assembly 1 satisfies the following condition: 175<FOV1/f1<190, which can reduce the image distortion properly. TTL1 is an interval from the object surface S11 of the first lens L11 to the image plane IMA1 along the optical axis OA1, and the unit of TTL1 is mm, $D1_1$ is an effective diameter of the first lens L11, the lens assembly 1 satisfies the following condition: $1 < TTL1/D1_1 < 1.5$, which can reduce the image distortion properly. $Vd1_2$ is the Abbe number of the second lens L12, $Vd1_3$ is the Abbe number of the third lens L13, the lens assembly 1 satisfies the following condition: $Vd1_2 - Vd1_3 < 5$, which can reduce the chromatic aberration properly.

By the above design of the lenses and stop ST1, the lens assembly 1 is provided with a shortened total lens length, a small F number, a wide field of view, an effective corrected aberration and resistance to variations of the ambient temperature.

In order to achieve the above purposes and effectively enhance the optical performance, the lens assembly 1 in accordance with the first embodiment of the invention is provided with the optical specifications shown in Table 1, which include the effective focal length, F-number, total lens length, radius of curvature of each lens surface in mm, thickness between adjacent surface in mm, refractive index of each lens and Abbe number of each lens. Table 1 shows that the effective focal length is equal to 1.029 mm, F-number is equal to 2.016, total lens length is equal to 13.5 mm for the lens assembly 1 of the first embodiment of the invention.

TABLE 1

Effective Focal Length = 1.029 mm
F-number = 2.016 Total Lens Length = 13.5 mm

| Surface Number | Radius of Curvature (mm) | Thickness (mm) | Nd | Vd | Remark |
|---|---|---|---|---|---|
| S11 | 13.014 | 1.000 | 1.8 | 46.5 | The First Lens L11 |
| S12 | 2.842 | 1.694 | | | |
| S13 | 4.999 | 1.218 | 1.61 | 25.6 | The Second Lens L12 |
| S14 | 1.034 | 1.332 | | | |
| S15 | 3.891 | 1.801 | 1.63 | 23.3 | The Third Lens L13 |
| S16 | −3.940 | 1.226 | | | |

TABLE 1-continued

Effective Focal Length = 1.029 mm
F-number = 2.016 Total Lens Length = 13.5 mm

| Surface Number | Radius of Curvature (mm) | Thickness (mm) | Nd | Vd | Remark |
|---|---|---|---|---|---|
| S17 | ∞ | 0.386 | | | Stop ST1 |
| S18 | 2.427 | 1.115 | 1.5 | 81.6 | The Fourth Lens L14 |
| S19 | −1.360 | 0.031 | | | |
| S110 | −2.724 | 0.544 | 1.65 | 21.5 | The Fifth Lens L15 |
| S111 | 2.128 | 0.125 | | | |
| S112 | 3.982 | 1.068 | 1.54 | 56.1 | The Sixth Lens L16 |
| S113 | −2.345 | 0.462 | | | |
| S114 | ∞ | 0.700 | 1.52 | 64.2 | Optical Filter OF1 |
| S115 | ∞ | 0.800 | | | |

The aspheric surface sag z of each lens in Table 1 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C and D of each surface are shown in Table 2.

TABLE 2

| Surface Number | k | A | B | C | D |
|---|---|---|---|---|---|
| S13 | −2.519 | −3.19E−03 | −3.63E−04 | −1.01E−04 | 8.65E−06 |
| S14 | −0.830 | 6.30E−03 | −8.83E−03 | −3.50E−03 | 4.79E−04 |
| S15 | 0.260 | 2.99E−03 | −3.24E−03 | 2.96E−03 | −7.55E−04 |
| S16 | −12.566 | −2.49E−02 | 1.01E−02 | −2.47E−03 | 1.64E−04 |
| S18 | 0.716 | −1.21E−03 | −1.11E−02 | 1.69E−03 | 2.24E−03 |
| S19 | −0.929 | 6.49E−02 | −5.98E−02 | 7.44E−02 | −2.67E−02 |
| S110 | 3.425 | −1.06E−01 | 9.28E−02 | 1.23E−02 | −1.20E−02 |
| S111 | −9.952 | −3.94E−02 | 4.02E−02 | −4.81E−03 | −3.34E−03 |
| S112 | −8.554 | −7.95E−03 | 5.86E−04 | 1.32E−02 | −4.81E−03 |
| S113 | −1.426 | −7.07E−03 | 1.54E−02 | −5.56E−03 | 2.70E−03 |

For the lens assembly 1 of the first embodiment, the effective focal length FEFL1 of a combination of the first lens L11, the second lens L12 and the third lens L13 is equal to 22.619 mm, the effective focal length BEFL1 of a combination of the fourth lens L14, the fifth lens L15 and the sixth lens L16 is equal to 3.107 mm, the horizontal field of view HFOV1 is equal to 180.1 degrees, the vertical field of view VFOV1 is equal to 120 degrees, the maximum field of view FOV1 is equal to 189 degrees, the effective focus length f1 is equal to 1.029 mm, the interval TTL1 from the object side surface S11 of the first lens L11 to an image plane along IMA1 the optical axis OA1 is equal to 13.5 mm, the effective diameter $D1_1$ of the first lens L11 is equal to 10.454 mm, the Abbe number $Vd1_2$ of the second lens L12 is equal to 25.6, the Abbe number $Vd1_3$ of the third lens L13 is equal to 23.3. According to the above data, the following values can be obtained: FEFL1/BEFL1=7.280, HFOV1=180.1, VFOV1=120, FOV1/f1=183.673, TTL1/$D1_1$=1.291, $Vd1_2$−$Vd1_3$=2.3, which respectively satisfy the above conditions (1)-(6).

Figure 2B:
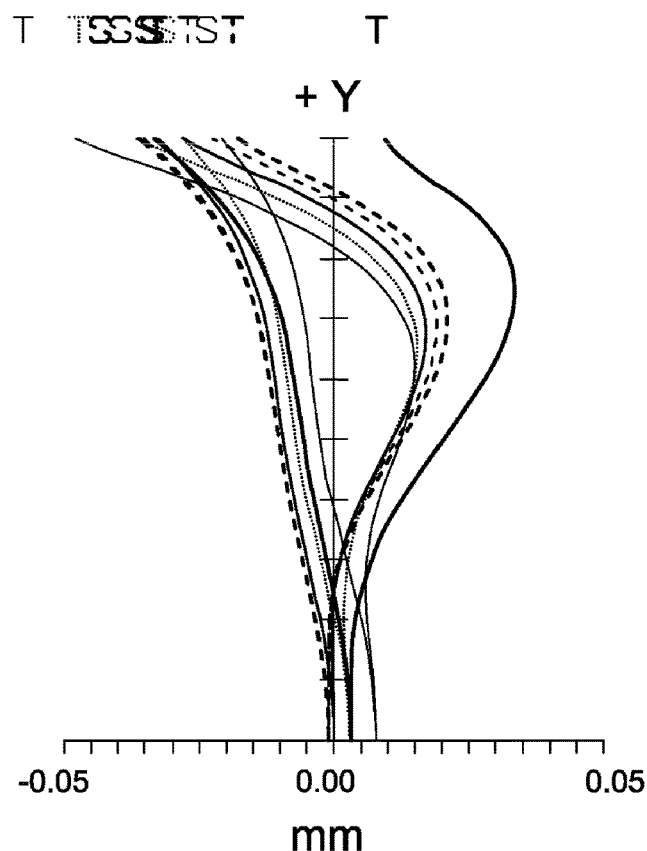
FIG. 2B is an astigmatic field curves diagram of a lens assembly in accordance with the first embodiment of the invention.
Figure 2C:
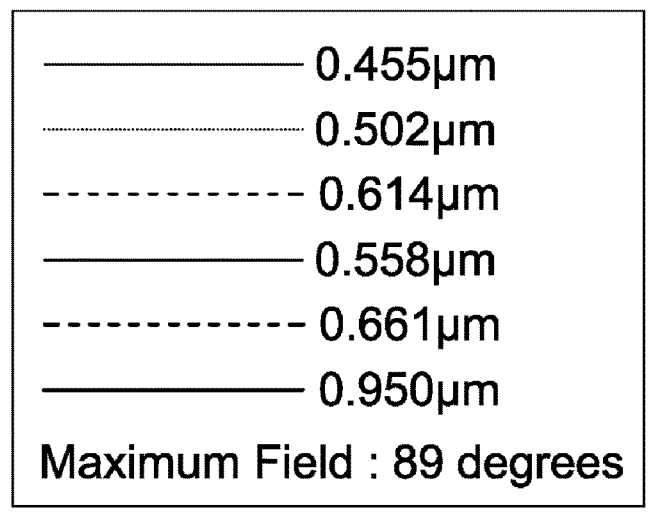
FIG. 2C is a distortion diagram of a lens assembly in accordance with the first embodiment of the invention.
Figure 2C:
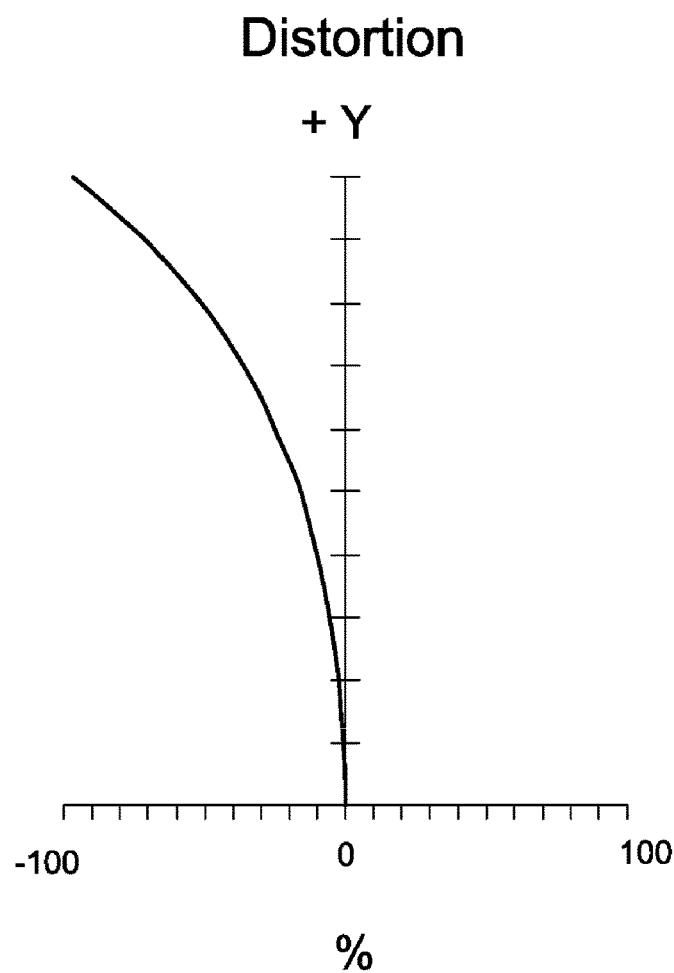

By the above arrangements of the lenses and stop ST1, the lens assembly 1 of the first embodiment can meet the requirements of optical performance as seen in FIGS. 2A-2C, wherein FIG. 2A shows a longitudinal aberration diagram of the lens assembly 1 in accordance with the first embodiment of the invention, FIG. 2B shows a field curvature diagram of the lens assembly 1 in accordance with the first embodiment of the invention and FIG. 2C shows a distortion diagram of the lens assembly 1 in accordance with the first embodiment of the invention.

It can be seen from FIG. 2A that the longitudinal aberration in the lens assembly 1 of the first embodiment ranges from −0.03 mm to 0.015 mm for the wavelength of 0.455 μm, 0.502 μm, 0.614 μm, 0.558 μm, 0.661 μm and 0.950 μm. It can be seen from FIG. 2B that the field curvature of tangential direction and sagittal direction in the lens assembly 1 of the first embodiment ranges from −0.05 mm to 0.035 mm for the wavelength of 0.455 μm, 0.502 μm, 0.614 μm, 0.558 μm, 0.661 μm and 0.950 μm. It can be seen from FIG. 2C (in which the six lines in the figure almost coincide to appear as if a signal line) that the distortion in the lens assembly 1 of the first embodiment ranges from −100% to 0% for the wavelength of 0.455 μm, 0.502 μm, 0.614 μm, 0.558 μm, 0.661 μm and 0.950 μm. It is obvious that the longitudinal aberration, the field curvature and the distortion of the lens assembly 1 of the first embodiment can be corrected effectively, thereby capable of good optical performance.

Figure 3:
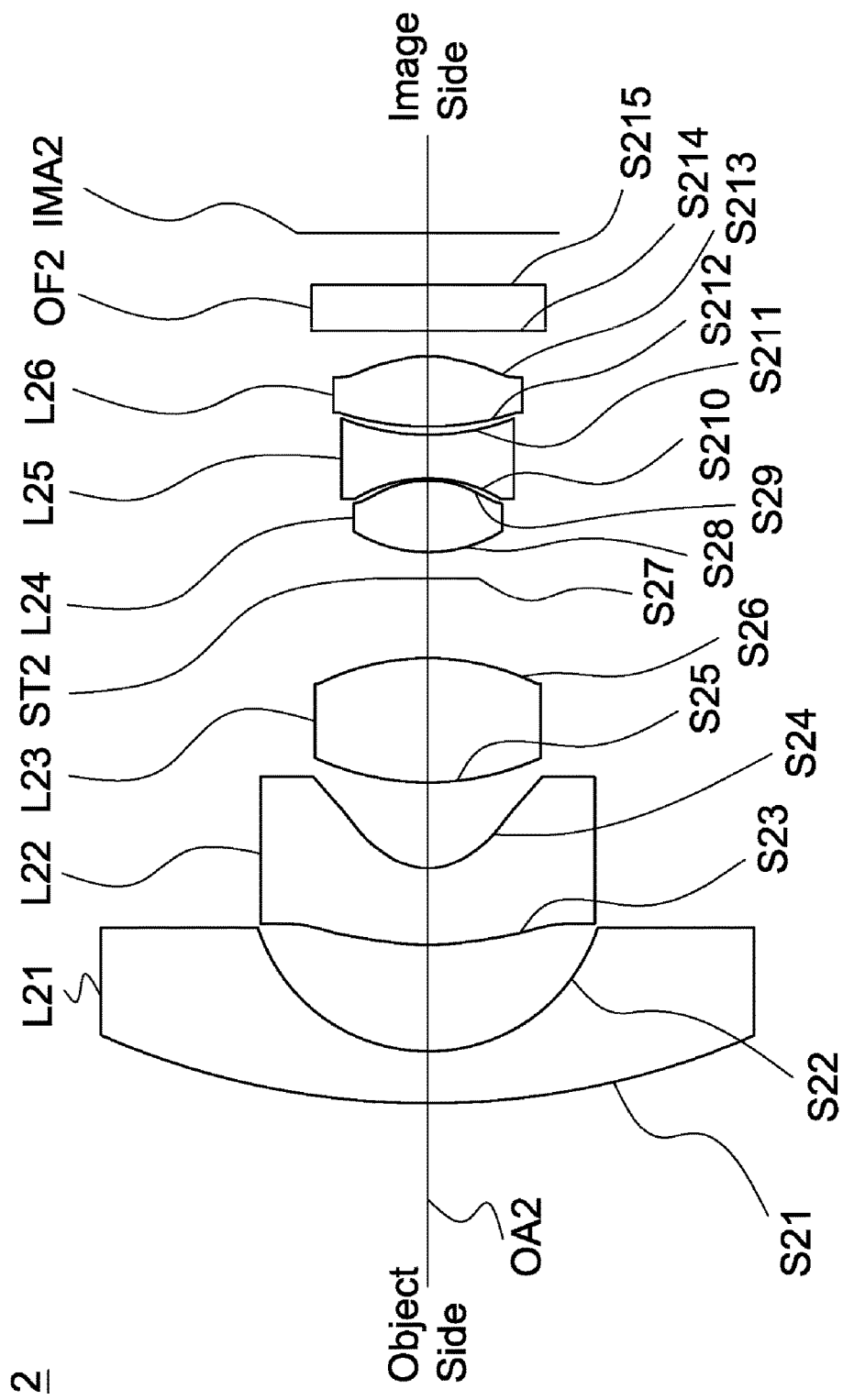
FIG. 3 is a lens layout and optical path diagram of a lens assembly in accordance with a second embodiment of the invention.

Referring to FIG. 3, FIG. 3 is a lens layout and optical path diagram of a lens assembly 2 in accordance with a second embodiment of the invention. The lens assembly 2 includes a first lens L21, a second lens L22, a third lens L23, a stop ST2, a fourth lens L24, a fifth lens L25, a sixth lens L26 and an optical filter OF2, all of which are arranged in sequence from an object side to an image side along an optical axis OA2. In operation, an image of light rays from the object side is formed at an image plane IMA2.

The first lens L21 is a meniscus lens with negative refractive power and made of glass material, wherein the object side surface S21 is a convex surface, the image side surface S22 is a concave surface and both of the object side surface S21 and image side surface S22 are spherical surfaces. The second lens L22 is a meniscus lens with negative refractive power and made of plastic material, wherein the object side surface S23 is a convex surface and having two inflection points, the image side surface S24 is a concave surface and both of the object side surface S23 and image side surface S24 are aspheric surfaces. The third lens L23 is a biconvex lens with positive refractive power and made of plastic material, wherein the object side surface S25 is a convex surface, the image side surface S26 is a convex surface and both of the object side surface S25 and image side surface S26 are aspheric surfaces. The fourth lens L14 is a biconvex lens with positive refractive power and made of glass material, wherein the object side surface S28 is a convex surface, the image side surface S29 is a convex surface and both of the object side surface S28 and image side surface S29 are aspheric surfaces. The fifth lens L25 is a biconcave lens with negative refractive power and made of plastic material, wherein the object side surface S210 is a concave surface, the image side surface S211 is a concave surface and both of the object side surface S210 and image side surface S211 are aspheric surfaces. The sixth lens L26 is a biconvex lens with positive refractive power and made of plastic material, wherein the object side surface S212 is a convex surface, the image side surface S213 is a convex surface and both of the object side surface S212 and image side surface S213 are aspheric surfaces. Both of the object side surface S214 and image side surface S215 of the optical filter OF2 are plane surfaces.

In order to maintain excellent optical performance of the lens assembly 2 in accordance with the second embodiment of the invention, the lens assembly 2 satisfies at least one of the following conditions:

$6 < FEFL2/BEFL2 < 10$ (7)

$HFOV2/f2 \geq 175°$ (8)

$VFOV2/f2 \geq 115°$ (9)

$175 < FOV1/f2 < 190$ (10)

$1 < TTL2/D2_1 < 1.5$ (11)

$Vd2_2 - Vd2_3 < 5$ (12)

Wherein FEFL2 is an effective focal length of a combination of the first lens L21, the second lens L22 and the third lens L23, and BEFL2 is an effective focal length of a combination of the fourth lens L24, the fifth lens L25 and the sixth lens L26, the lens assembly 2 satisfies the following condition: $6 < FEFL2/BEFL2 < 10$, which can provide excellent imaging quality in both high and low temperature environments. HFOV2 is a horizontal field of view of the lens assembly 2. VFOV2 is a vertical field of view of the lens assembly 2. FOV2 is a maximum field of view of the lens assembly 2, and the unit of FOV2 is degree, f2 is an effective focal length of the lens assembly 2, and the unit of f2 is mm, the lens assembly 2 satisfies the following condition: $175 < FOV2/f2 < 190$, which can reduce the image distortion properly. TTL2 is an interval from the object surface S21 of the first lens L21 to the image plane IMA2 along the optical axis OA2, and the unit of TTL2 is mm, $D2_1$ is an effective diameter of the first lens L21, the lens assembly 2 satisfies the following condition: $1 < TTL2/D2_1 < 1.5$, which can reduce the image distortion properly. $Vd2_2$ is the Abbe number of the second lens L22, $Vd2_3$ is the Abbe number of the third lens L23, the lens assembly 2 satisfies the following condition: $Vd2_2 - Vd2_3 < 5$, which can reduce the chromatic aberration properly.

By the above design of the lenses and stop ST2, the lens assembly 2 is provided with a shortened total lens length, a small F number, a wide field of view, an effective corrected aberration and resistance to variations of the ambient temperature.

In order to achieve the above purposes and effectively enhance the optical performance, the lens assembly 2 in accordance with the second embodiment of the invention is provided with the optical specifications shown in Table 3, which include the effective focal length, F-number, total lens length, radius of curvature of each lens surface in mm, thickness between adjacent surface in mm, refractive index of each lens and Abbe number of each lens. Table 3 shows that the effective focal length is equal to 1.041 mm, F-number is equal to 2.017, total lens length is equal to 13.5 mm for the lens assembly 2 of the second embodiment of the invention.

TABLE 3

Effective Focal Length = 1.041 mm
F-number = 2.017 Total Lens Length = 13.5 mm

| Surface Number | Radius of Curvature (mm) | Thickness (mm) | Nd | Vd | Remark |
|---|---|---|---|---|---|
| S21 | 12.749 | 0.819 | 1.8 | 46.5 | The First Lens L21 |
| S22 | 2.796 | 1.637 | | | |
| S23 | 4.678 | 1.192 | 1.61 | 25.6 | The Second Lens L22 |
| S24 | 1.034 | 1.331 | | | |
| S25 | 4.089 | 1.921 | 1.63 | 23.3 | The Third Lens L23 |
| S26 | −3.862 | 1.267 | | | |
| S27 | ∞ | 0.398 | | | Stop ST2 |
| S28 | 2.389 | 1.102 | 1.5 | 81.6 | The Fourth Lens L24 |
| S29 | −1.390 | 0.030 | | | |
| S210 | −2.700 | 0.661 | 1.65 | 21.5 | The Fifth Lens L25 |
| S211 | 2.081 | 0.131 | | | |
| S212 | 3.896 | 1.088 | 1.54 | 56.1 | The Sixth Lens L26 |
| S213 | −2.279 | 0.424 | | | |
| S214 | ∞ | 0.700 | 1.52 | 64.2 | Optical Filter OF1 |
| S215 | ∞ | 0.800 | | | |

The aspheric surface sag z of each lens in Table 3 can be calculated by the following formula:

$$z = ch^2/\{1-[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the second embodiment, the conic constant k and the aspheric coefficients A, B, C, D and G of each surface are shown in Table 4.

TABLE 4

| Surface Number | k | A | B | C | D |
|---|---|---|---|---|---|
| S23 | −2.410 | −3.14E−03 | −3.98E−04 | −9.70E−05 | 9.27E−06 |
| S24 | −0.818 | 7.00E−03 | −8.52E−03 | −3.67E−03 | 4.99E−04 |
| S25 | 0.000 | 4.12E−03 | −3.54E−03 | 2.77E−03 | −7.13E−04 |
| S26 | −12.341 | −2.65E−02 | 9.74E−03 | −2.60E−03 | 2.07E−04 |
| S28 | 0.826 | 1.15E−03 | −1.04E−02 | 4.91E−03 | 9.29E−04 |
| S29 | −0.911 | 6.36E−02 | −4.62E−02 | 7.49E−02 | −2.94E−02 |
| S210 | 3.313 | −1.00E−01 | 9.30E−02 | 1.38E−02 | −1.42E−02 |
| S211 | −9.684 | −3.89E−02 | 3.62E−02 | −3.91E−03 | −2.60E−03 |
| S212 | −10.635 | −8.73E−03 | 1.02E−03 | 1.19E−02 | −4.06E−03 |
| S213 | −1.568 | −5.96E−03 | 1.57E−02 | −6.87E−03 | 2.95E−03 |

For the lens assembly 2 of the second embodiment, the effective focal length FEFL2 of a combination of the first lens L21, the second lens L22 and the third lens L23 is equal to 27.628 mm, the effective focal length BEFL2 of a combination of the fourth lens L24, the fifth lens L25 and the sixth lens L26 is equal to 3.172 mm, the horizontal field of view HFOV2 is equal to 180.2 degrees, the vertical field of view VFOV2 is equal to 121.8 degrees, the maximum field of view FOV2 is equal to 188.6 degrees, the effective focus length f2 is equal to 1.041 mm, the interval TTL2 from the object side surface S21 of the first lens L21 to an image plane along IMA2 the optical axis OA2 is equal to 13.5 mm, the effective diameter $D2_1$ of the first lens L21 is equal to 10.065 mm, the Abbe number $Vd2_2$ of the second lens L22 is equal to 25.6, the Abbe number $Vd2_3$ of the third lens L23 is equal to 23.3. According to the above data, the following values can be obtained: FEFL2/BEFL2=8.710, HFOV2=180.2, VFOV2=121.8, FOV2/f2=181.172, TTL2/$D2_1$=1.341, $Vd2_2$–$Vd2_3$=2.3, which respectively satisfy the above conditions (7)-(12).

Figure 4A:
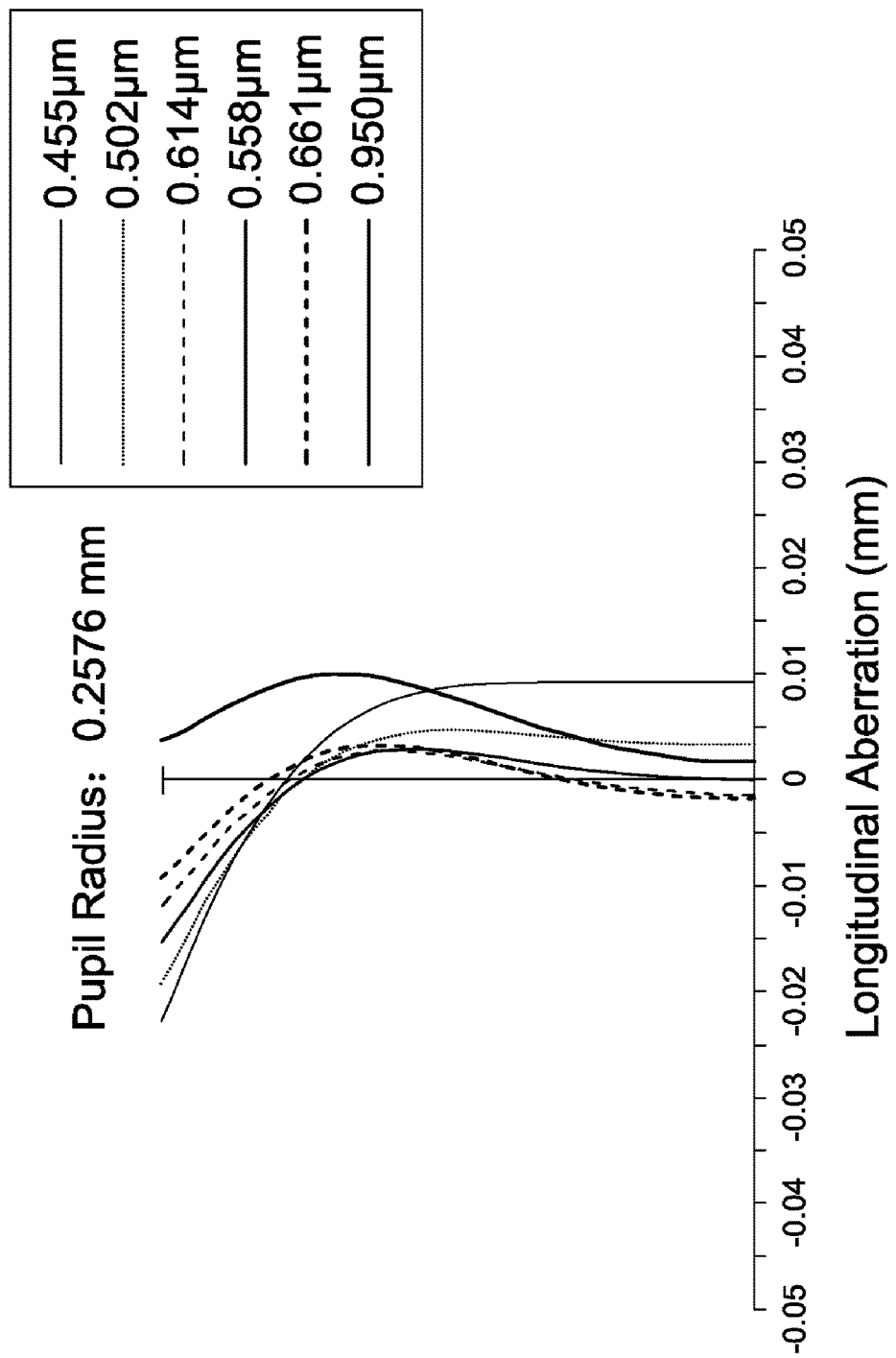
FIG. 4A is a longitudinal spherical aberration diagram of a lens assembly in accordance with the second embodiment of the invention.
Figure 4B:
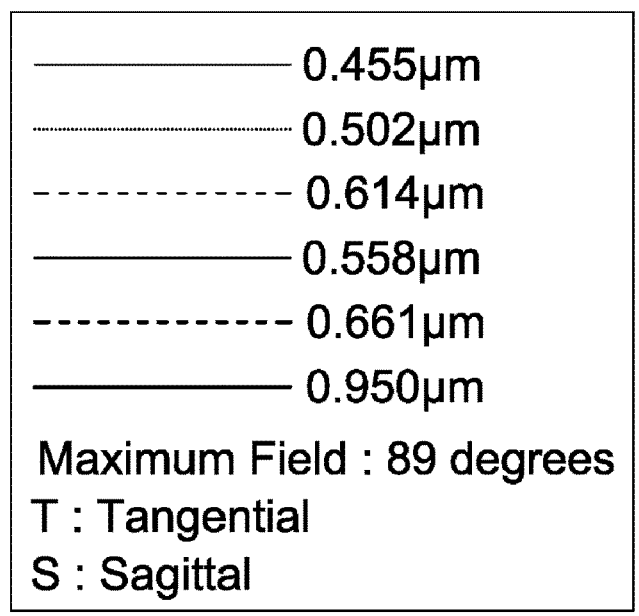
FIG. 4B is an astigmatic field curves diagram of a lens assembly in accordance with the second embodiment of the invention.
Figure 4B:
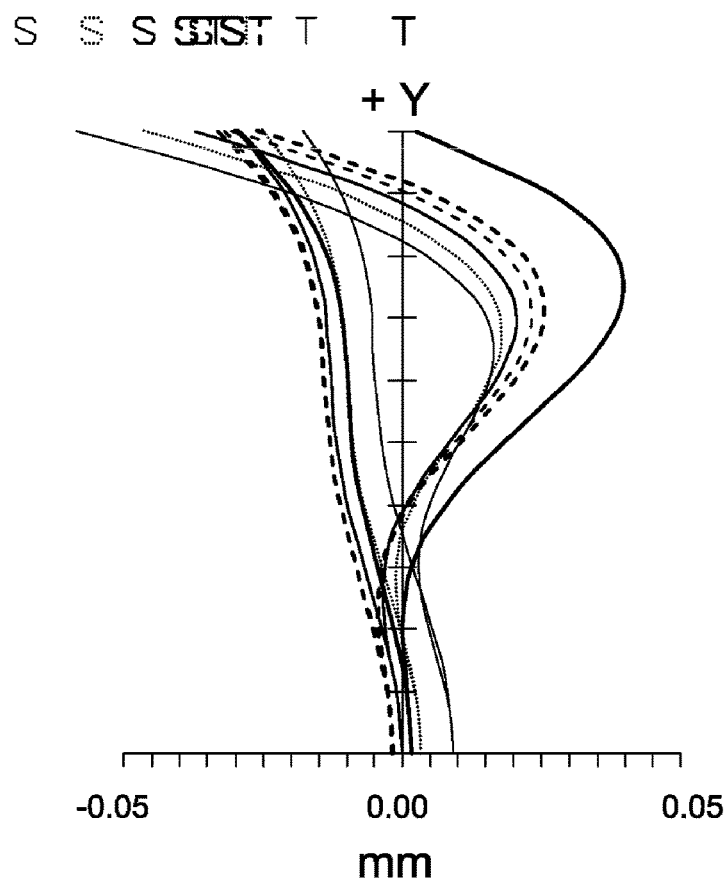
Figure 4C:
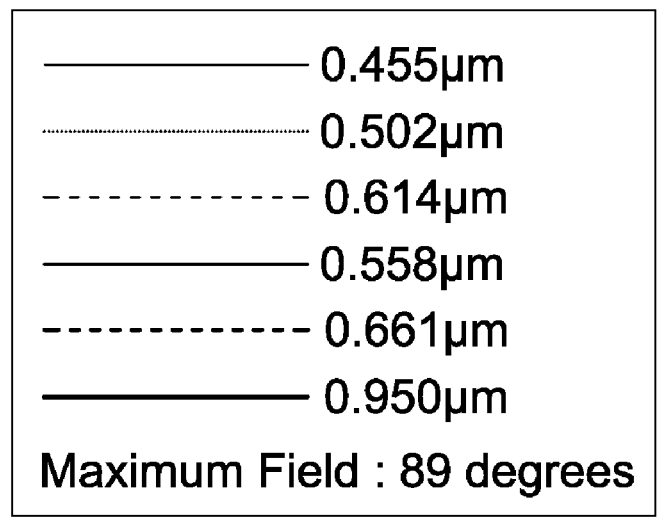
FIG. 4C is a distortion diagram of a lens assembly in accordance with the second embodiment of the invention.
Figure 4C:
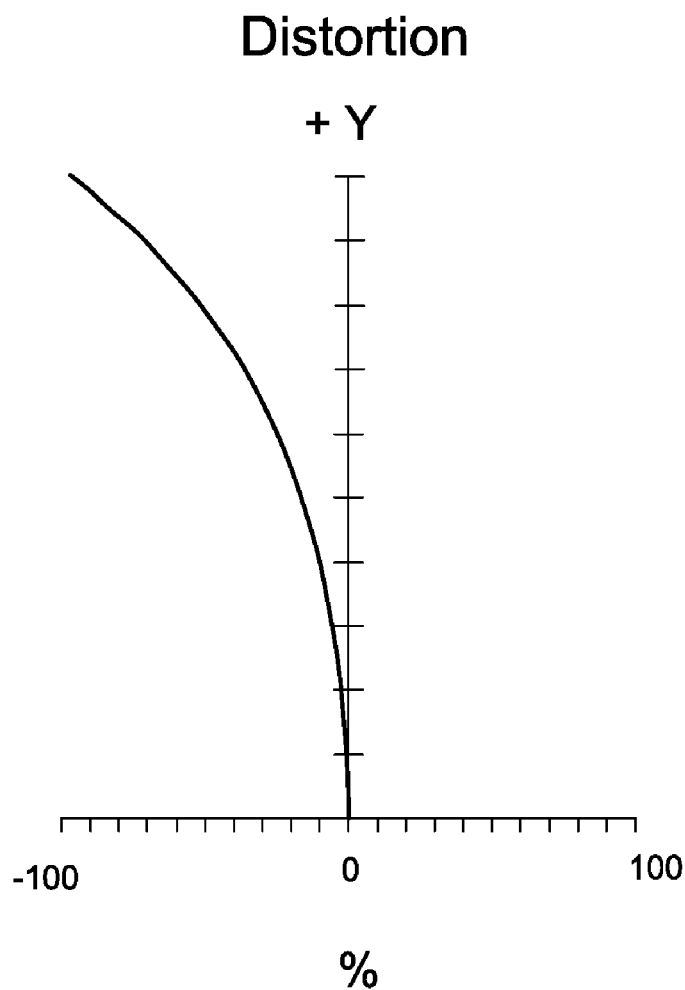

By the above arrangements of the lenses and stop ST2, the lens assembly 2 of the second embodiment can meet the requirements of optical performance as seen in FIGS. 4A-4C, wherein FIG. 4A shows a longitudinal aberration diagram of the lens assembly 2 in accordance with the second embodiment of the invention, FIG. 4B shows a field curvature diagram of the lens assembly 2 in accordance with the second embodiment of the invention and FIG. 4C shows a distortion diagram of the lens assembly 2 in accordance with the second embodiment of the invention.

It can be seen from FIG. 4A that the longitudinal aberration in the lens assembly 2 of the second embodiment ranges from −0.025 mm to 0.01 mm for the wavelength of 0.455 μm, 0.502 μm, 0.614 μm, 0.558 μm, 0.661 μm and 0.950 μm. It can be seen from FIG. 4B that the field curvature of tangential direction and sagittal direction in the lens assembly 2 of the second embodiment ranges from −0.06 mm to 0.04 mm for the wavelength of 0.455 μm, 0.502 μm, 0.614 μm, 0.558 μm, 0.661 μm and 0.950 μm. It can be seen from FIG. 4C (in which the six lines in the figure almost coincide to appear as if a signal line) that the distortion in the lens assembly 2 of the second embodiment ranges from −100% to 0% for the wavelength of 0.455 μm, 0.502 μm, 0.614 μm, 0.558 μm, 0.661 μm and 0.950 μm. It is obvious that the longitudinal aberration, the field curvature and the distortion of the lens assembly 2 of the second embodiment can be corrected effectively, thereby capable of good optical performance.

Figure 5:
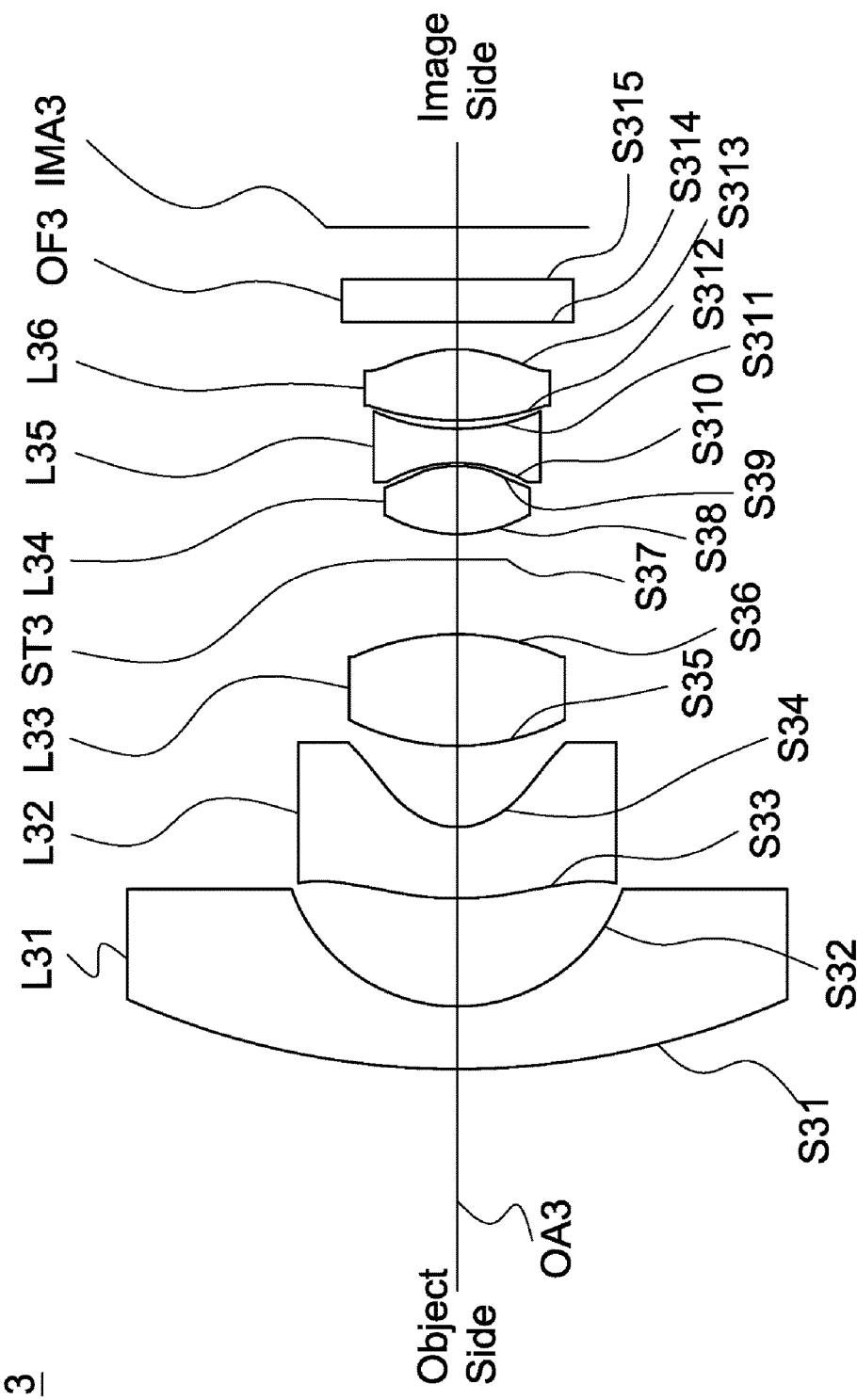
FIG. 5 is a lens layout and optical path diagram of a lens assembly in accordance with a third embodiment of the invention.

Referring to FIG. 5, FIG. 5 is a lens layout and optical path diagram of a lens assembly 3 in accordance with a third embodiment of the invention. The lens assembly 3 includes a first lens L31, a second lens L32, a third lens L33, a stop ST3, a fourth lens L34, a fifth lens L35, a sixth lens L36 and an optical filter OF3, all of which are arranged in sequence from an object side to an image side along an optical axis OA3. In operation, an image of light rays from the object side is formed at an image plane IMA3.

The first lens L31 is a meniscus lens with negative refractive power and made of glass material, wherein the object side surface S31 is a convex surface, the image side surface S32 is a concave surface and both of the object side surface S31 and image side surface S32 are spherical surfaces. The second lens L32 is a meniscus lens with negative refractive power and made of plastic material, wherein the object side surface S33 is a convex surface and having two inflection points, the image side surface S34 is a concave surface and both of the object side surface S33 and image side surface S34 are aspheric surfaces. The third lens L33 is a biconvex lens with positive refractive power and made of plastic material, wherein the object side surface S35 is a convex surface, the image side surface S36 is a convex surface and both of the object side surface S35 and image side surface S36 are aspheric surfaces. The fourth lens L34 is a biconvex lens with positive refractive power and made of glass material, wherein the object side surface S38 is a convex surface, the image side surface S39 is a convex surface and both of the object side surface S38 and image side surface S39 are aspheric surfaces. The fifth lens L35 is a biconcave lens with negative refractive power and made of plastic material, wherein the object side surface S310 is a concave surface, the image side surface S311 is a concave surface and both of the object side surface S310 and image side surface S311 are aspheric surfaces. The sixth lens L36 is a biconvex lens with positive refractive power and made of plastic material, wherein the object side surface S312 is a convex surface, the image side surface S313 is a convex surface and both of the object side surface S312 and image side surface S313 are aspheric surfaces. Both of the object side surface S314 and image side surface S315 of the optical filter OF3 are plane surfaces.

In order to maintain excellent optical performance of the lens assembly 3 in accordance with the first embodiment of the invention, the lens assembly 3 satisfies at least one of the following conditions:

$$6 < FEFL3/BEFL3 < 10 \tag{13}$$

$$HFOV3/f3 \geq 175° \tag{14}$$

$$VFOV3/f3 \geq 115° \tag{15}$$

$$175 < FOV3/f3 < 190 \tag{16}$$

$$1 < TTL3/D3_1 < 1.5 \tag{17}$$

$$Vd3_2 - Vd3_3 < 5 \tag{18}$$

Wherein FEFL3 is an effective focal length of a combination of the first lens L31, the second lens L32 and the third lens L33, and BEFL3 is an effective focal length of a combination of the fourth lens L34, the fifth lens L35 and the sixth lens L36, the lens assembly 3 satisfies the following condition: 6<FEFL3/BEFL3<10, which can provide excellent imaging quality in both high and low temperature environments. HFOV3 is a horizontal field of view of the lens assembly 3. VFOV3 is a vertical field of view of the lens assembly 3. FOV3 is a maximum field of view of the lens assembly 3, and the unit of FOV3 is degree, f3 is an effective focal length of the lens assembly 3, and the unit of f3 is mm, the lens assembly 3 satisfies the following condition: 175<FOV3/f3<190, which can reduce the image distortion properly. TTL3 is an interval from the object surface S31 of the first lens L31 to the image plane IMA3 along the optical axis OA3, and the unit of TTL3 is mm, $D3_1$ is an effective diameter of the first lens L31, the lens assembly 3 satisfies the following condition: 1<TTL3/$D3_1$<1.5, which can reduce the image distortion properly. $Vd3_2$ is the Abbe number of the second lens L32, $Vd3_3$ is the Abbe number of the third lens L33, the lens assembly 3 satisfies the following condition: $Vd3_2$–$Vd3_3$<5, which can reduce the chromatic aberration properly.

By the above design of the lenses and stop ST3, the lens assembly 3 is provided with a shortened total lens length, a small F number, a wide field of view, an effective corrected aberration and resistance to variations of the ambient temperature.

In order to achieve the above purposes and effectively enhance the optical performance, the lens assembly 3 in accordance with the third embodiment of the invention is provided with the optical specifications shown in Table 5, which include the effective focal length, F-number, total lens length, radius of curvature of each lens surface in mm, thickness between adjacent surface in mm, refractive index of each lens and Abbe number of each lens. Table 5 shows that the effective focal length is equal to 1.046 mm, F-number is equal to 2.016, total lens length is equal to 13.5 mm for the lens assembly 3 of the third embodiment of the invention.

TABLE 5

Effective Focal Length = 1.046 mm
F-number = 2.016 Total Lens Length = 13.5 mm

| Surface Number | Radius of Curvature (mm) | Thickness (mm) | Nd | Vd | Remark |
|---|---|---|---|---|---|
| S31 | 12.890 | 1.000 | 1.8 | 46.5 | The First Lens L31 |
| S32 | 2.805 | 1.739 | | | |
| S33 | 5.027 | 1.160 | 1.61 | 25.6 | The Second Lens L32 |
| S34 | 1.035 | 1.300 | | | |
| S35 | 3.815 | 1.780 | 1.63 | 23.3 | The Third Lens L33 |
| S36 | −3.874 | 1.201 | | | |
| S37 | ∞ | 0.424 | | | Stop ST3 |
| S38 | 2.392 | 1.100 | 1.5 | 81.6 | The Fourth Lens L34 |
| S39 | −1.390 | 0.032 | | | |
| S310 | −2.701 | 0.557 | 1.65 | 21.5 | The Fifth Lens L35 |
| S311 | 2.116 | 0.131 | | | |
| S312 | 3.909 | 1.132 | 1.54 | 56.1 | The Sixth Lens L36 |
| S313 | −2.310 | 0.444 | | | |
| S314 | ∞ | 0.700 | 1.52 | 64.2 | Optical Filter OF3 |
| S315 | ∞ | 0.800 | | | |

The aspheric surface sag z of each lens in table 5 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the third embodiment, the conic constant k and the aspheric coefficients A, B, C and D of each surface are shown in Table 6.

TABLE 6

| Surface Number | k | A | B | C | D |
|---|---|---|---|---|---|
| S33 | −3.198 | −3.88E−03 | −4.49E−04 | −7.58E−05 | 7.62E−06 |
| S34 | −0.820 | 6.14E−03 | −8.86E−03 | −3.98E−03 | 5.66E−04 |
| S35 | 0.000 | 4.36E−03 | −3.41E−03 | 2.84E−03 | −7.61E−04 |
| S36 | −12.335 | −2.57E−02 | 1.00E−02 | −2.58E−03 | 1.82E−04 |
| S38 | 0.845 | 1.99E−04 | −8.89E−03 | 1.66E−03 | 3.22E−03 |
| S39 | −0.884 | 6.43E−02 | −5.30E−02 | 7.61E−02 | −2.76E−02 |
| S310 | 3.410 | −1.11E−01 | 9.70E−02 | 1.45E−02 | −1.49E−02 |
| S311 | −10.428 | −3.93E−02 | 3.77E−02 | −4.02E−03 | −2.79E−03 |
| S312 | −10.420 | −8.78E−03 | 9.37E−04 | 1.19E−02 | −3.77E−03 |
| S313 | −1.310 | −7.86E−03 | 1.61E−02 | −6.49E−03 | 2.91E−03 |

For the lens assembly 3 of the third embodiment, the effective focal length FEFL3 of a combination of the first lens L31, the second lens L32 and the third lens L33 is equal to 24.682 mm, the effective focal length BEFL3 of a combination of the fourth lens L34, the fifth lens L35 and the sixth lens L36 is equal to 3.155 mm, the horizontal field of view HFOV3 is equal to 180.2 degrees, the vertical field of view VFOV3 is equal to 120.0 degrees, the maximum field of view FOV3 is equal to 188.6 degrees, the effective focus length f3 is equal to 1.046 mm, the interval TTL3 from the object side surface S31 of the first lens L31 to an image plane along IMA3 the optical axis OA3 is equal to 13.5 mm, the effective diameter $D3_1$ of the first lens L31 is equal to 10.452 mm, the Abbe number $Vd3_2$ of the second lens L32 is equal to 25.6, the Abbe number $Vd3_3$ of the third lens L33 is equal to 23.3. According to the above data, the following values can be obtained: FEFL3/BEFL3=7.823, HFOV3=180.2, VFOV3=120.0, FOV3/f3=180.306, TTL3/$D3_1$=1.291, $Vd3_2-Vd3_3$=2.3, which respectively satisfy the above conditions (13)-(18).

Figure 6A:
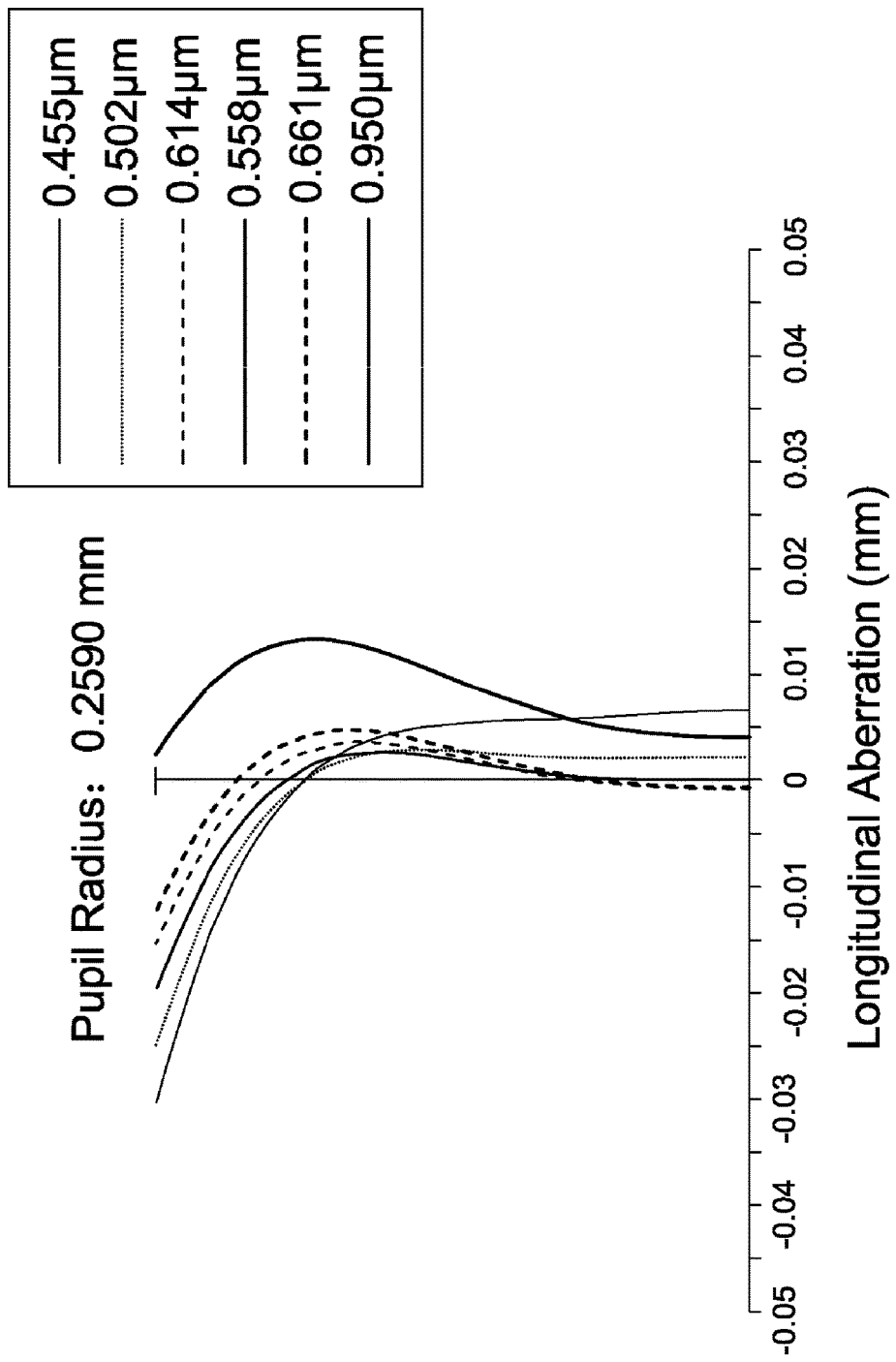
FIG. 6A is a longitudinal spherical aberration diagram of a lens assembly in accordance with the third embodiment of the invention.
Figure 6B:
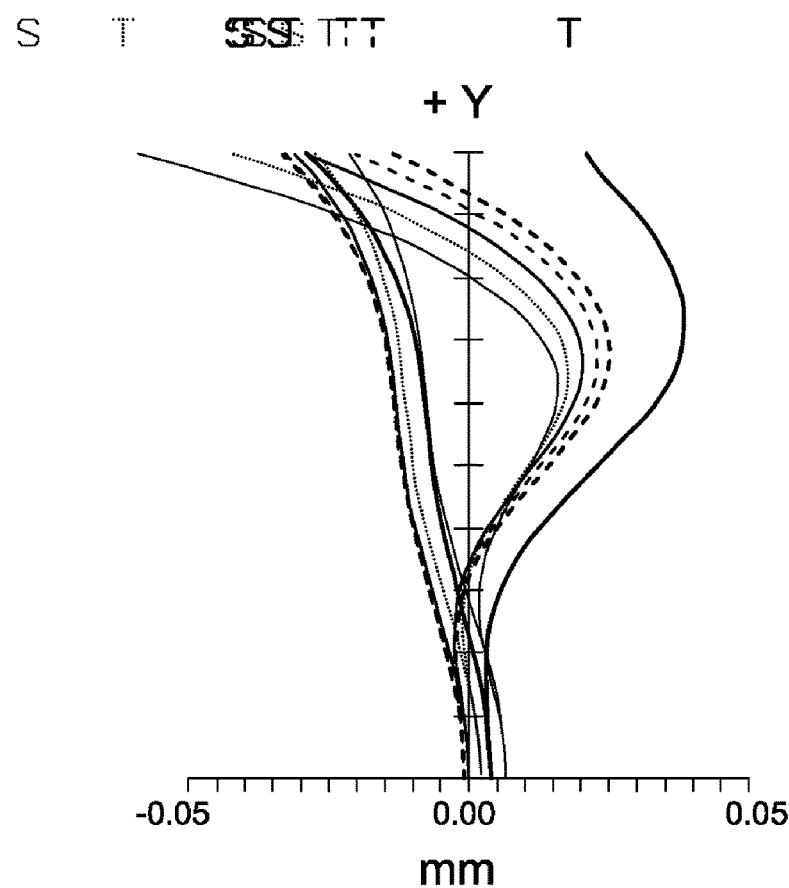
FIG. 6B is an astigmatic field curves diagram of a lens assembly in accordance with the third embodiment of the invention.
Figure 6C:
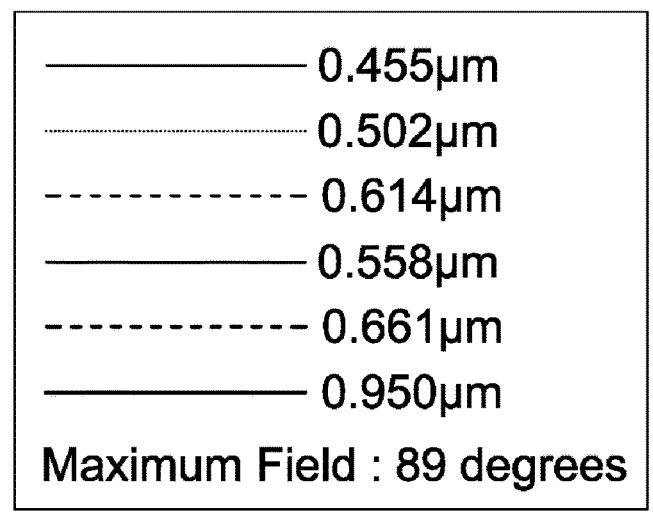
FIG. 6C is a distortion diagram of a lens assembly in accordance with the third embodiment of the invention.
Figure 6C:
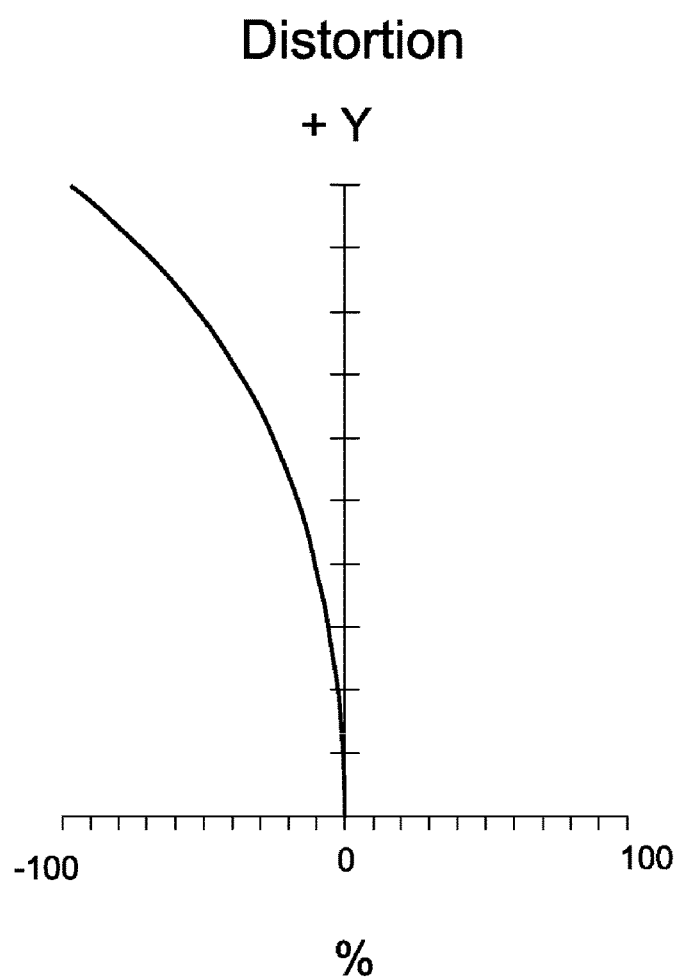

By the above arrangements of the lenses and stop ST3, the lens assembly 3 of the third embodiment can meet the requirements of optical performance as seen in FIGS. 6A-6C, wherein FIG. 6A shows a longitudinal aberration diagram of the lens assembly 3 in accordance with the third embodiment of the invention, FIG. 6B shows a field curvature diagram of the lens assembly 3 in accordance with the third embodiment of the invention and FIG. 6C shows a distortion diagram of the lens assembly 3 in accordance with the third embodiment of the invention.

It can be seen from FIG. 6A that the longitudinal aberration in the lens assembly 3 of the third embodiment ranges from −0.035 mm to 0.015 mm for the wavelength of 0.455 μm, 0.502 μm, 0.614 μm, 0.558 μm, 0.661 μm and 0.950 μm. It can be seen from FIG. 6B that the field curvature of tangential direction and sagittal direction in the lens assembly 3 of the third embodiment ranges from −0.06 mm to 0.04 mm for the wavelength of 0.455 μm, 0.502 μm, 0.614 μm, 0.558 μm, 0.661 μm and 0.950 μm. It can be seen from FIG. 6C (in which the six lines in the figure almost coincide to appear as if a signal line) that the distortion in the lens assembly 3 of the third embodiment ranges from −100% to 0% for the wavelength of 0.455 μm, 0.502 μm, 0.614 μm, 0.558 μm, 0.661 μm and 0.950 μm. It is obvious that the longitudinal aberration, the field curvature and the distortion of the lens assembly 3 of the third embodiment can be corrected effectively, thereby capable of good optical performance.

While the invention has been described by way of example and in terms of embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens assembly, in sequence from an object side to an image side along an optical axis, comprising:

a first lens which is a meniscus lens with negative refractive power;
a second lens which is a meniscus lens with negative refractive power;
a third lens which is a biconvex lens with positive refractive power;
a fourth lens which is a biconvex lens with positive refractive power;
a fifth lens which is a biconcave lens with negative refractive power; and
a sixth lens which is a biconvex lens with positive refractive power;
the lens assembly satisfying the following condition:

$6<FEFL/BEFL<10$ wherein FEFL is an effective focal length of a combination of the first lens, the second lens and the third lens, and BEFL is an effective focal length of a combination of the fourth lens, the fifth lens and the sixth lens.

2. The lens assembly as claimed in claim 1, wherein the lens assembly satisfies:

$HFOV/f \geq 175°$ wherein HFOV is a horizontal field of view, f is an effective focal length of the lens assembly.

3. The lens assembly as claimed in claim 2, wherein the lens assembly satisfies:

$VFOV/f \geq 115°$ wherein VFOV is a vertical field of view, f is an effective focal length of the lens assembly.

4. The lens assembly as claimed in claim 1, wherein the lens assembly satisfies:

$175<FOV/f<190$ wherein FOV is a maximum field of view, and the unit of FOV is degree, f is an effective focal length of the lens assembly, and the unit off is mm.

5. The lens assembly as claimed in claim 1, wherein the lens assembly satisfies:

$1<TTL/D_1<1.5$ wherein TTL is an interval from the object side surface of the first lens to an image plane along the optical axis, $D_1$ is an effective diameter of the first lens.

6. The lens assembly as claimed in claim 1, wherein the third lens and the fourth lens satisfies:

$Vd_2-Vd_3<5$ wherein $Vd_2$ is the Abbe number of the second lens, $Vd_3$ is the Abbe number of the third lens.

7. The lens assembly as claimed in claim 1, wherein the second lens includes at least an inflection point.

8. The lens assembly as claimed in claim 1, wherein the second lens is made of plastic material, the third lens is made of plastic material, the fifth lens is made of material, the sixth lens is made of plastic material.

9. The lens assembly as claimed in claim 1, wherein the second lens has at least one of an object side surface and an image side surface being aspheric, the third lens has at least one of an object side surface and an image side surface being aspheric, the fourth lens has at least one of an object side surface and an image side surface being aspheric, the fifth lens has at least one of an object side surface and an image side surface being aspheric, the sixth lens has at least one of an object side surface and an image side surface being aspheric.

10. The lens assembly as claimed in claim 9, wherein both of an object side surface and an image side surface of the second lens are aspheric, both of an object side surface and an image side surface of the third lens are aspheric, both of an object side surface and an image side surface of the fourth lens are aspheric, both of an object side surface and an image side surface of the fifth lens are aspheric, both of an object side surface and an image side surface of the sixth lens are aspheric.

11. The lens assembly as claimed in claim 1, further comprising a stop disposed between the third lens and the fourth lens.

12. The lens assembly as claimed in claim 11, wherein the first lens includes a convex surface facing the object side and a concave surface facing the image side, the second lens includes convex surface facing the object side and a concave surface facing the image side.

13. A lens assembly, in sequence from an object side to an image side along an optical axis, comprising:
a first lens which is a meniscus lens with negative refractive power;
a second lens which is a meniscus lens with negative refractive power;
a third lens which is a biconvex lens with positive refractive power;
a fourth lens which is a biconvex lens with positive refractive power;
a fifth lens which is a biconcave lens with negative refractive power; and
a sixth lens which is a biconvex lens with positive refractive power;
the lens assembly satisfying the following condition:

$175<FOV/f<190$ wherein FOV is a maximum field of view, and the unit of FOV is degree, f is an effective focal length of the lens assembly, and the unit off is mm.

14. The lens assembly as claimed in claim 13, wherein the lens assembly satisfies:

$HFOV/f \geq 175°$ wherein HFOV is a horizontal field of view, f is an effective focal length of the lens assembly.

15. The lens assembly as claimed in claim 14, wherein the lens assembly satisfies:

$VFOV/f \geq 115°$ wherein VFOV is a vertical field of view, f is an effective focal length of the lens assembly.

16. The lens assembly as claimed in claim 13, wherein the lens assembly satisfies:

$6<FEFL/BEFL<10$ wherein FEFL is an effective focal length of a combination of the first lens, the second lens and the third lens, and BEFL is an effective focal length of a combination of the fourth lens, the fifth lens and the sixth lens.

17. The lens assembly as claimed in claim 13, wherein the lens assembly satisfies:

$1<TTL/D_1<1.5$ wherein TTL is an interval from the object side surface of the first lens to an image plane along the optical axis, $D_1$ is an effective diameter of the first lens.

18. The lens assembly as claimed in claim 13, wherein the third lens and the fourth lens satisfies:

$Vd_2-Vd_3<5$ wherein $Vd_2$ is the Abbe number of the second lens, $Vd_3$ is the Abbe number of the third lens.

19. The lens assembly as claimed in claim 13, wherein the second lens includes at least an inflection point.

20. The lens assembly as claimed in claim 13, further comprising a stop disposed between the third lens and the fourth lens.

* * * * *